April 24, 1956 R. S. STANTON ET AL 2,743,360
PULSE-LENGTH SWITCHING CIRCUIT
Filed Feb. 2, 1953
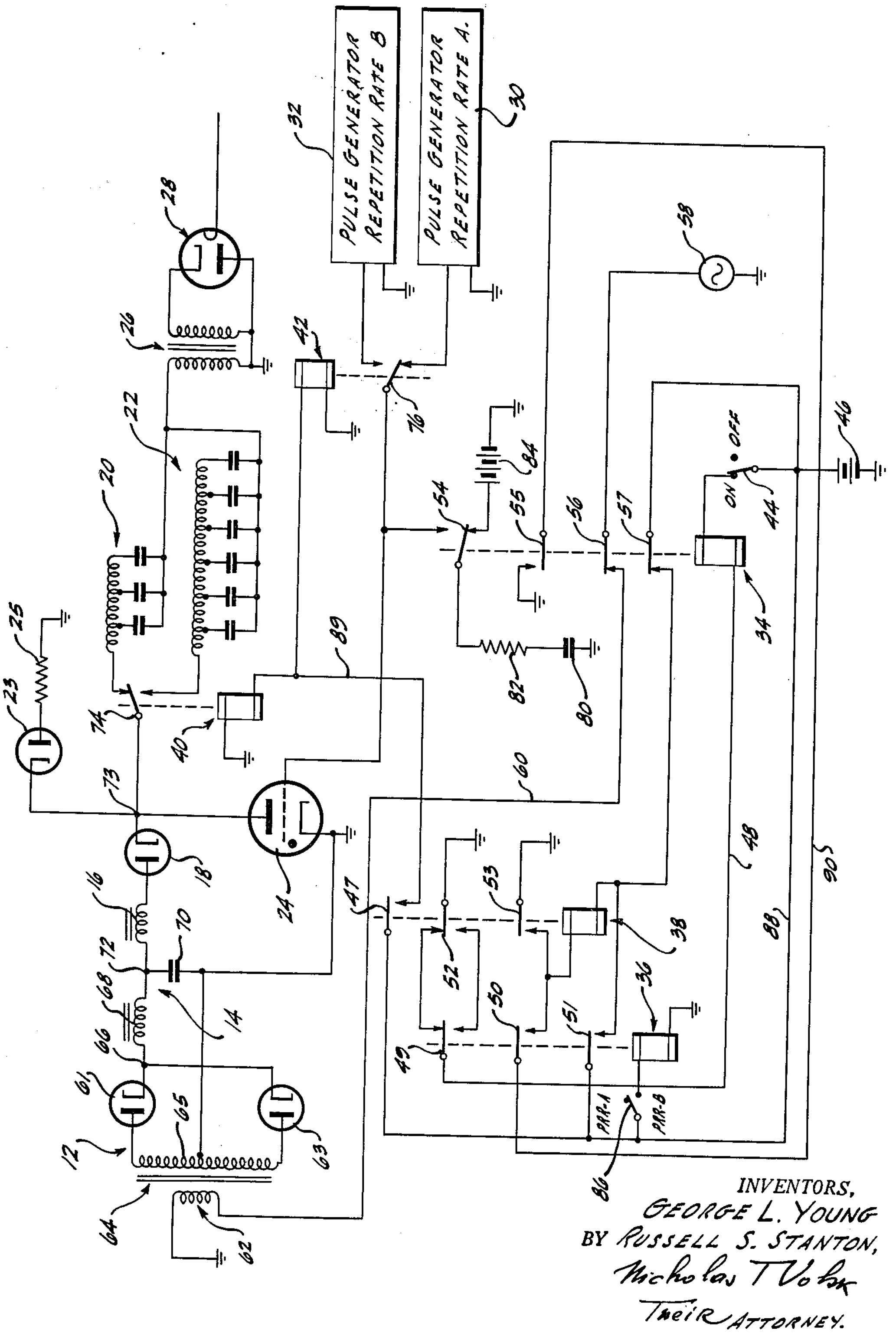
INVENTORS,
GEORGE L. YOUNG
BY RUSSELL S. STANTON,
Nicholas T Volsk
THEIR ATTORNEY.

United States Patent Office 2,743,360

Patented Apr. 24, 1956

2,743,360

PULSE-LENGTH SWITCHING CIRCUIT

Russell S. Stanton and George Yucht, Los Angeles, Calif.; said Yucht, now by change of name George L. Young, assignors, by mesne assignments, to Hughes Aircraft Company, a corporation of Delaware Application February 2, 1953, Serial No. 334,612

6 Claims. (Cl. 250—27)

This invention relates to switching circuits and more particularly to a circuit for automatically changing the time duration of the pulses produced by a line-type modulator of a radar system.

Conventional radar search and tracking systems generally radiate a pulse of long duration for the long distance search phase of their operation and radiate a pulse of short duration for the tracking phase of operation and for search phases requiring high definition. Inasmuch as the duty cycle of the transmitter of the radar system should preferably remain substantially constant, it is also desirable that the repetition rate of the radiated pulses be changed in accordance with changes of the length or duration of the radiated pulses.

In general, line-type modulators developing high-voltage output pulses are used in such radar systems and comprise a network simulating a transmission line, the electrical length of which determines the duration or length of the pulse formed by it. This network is charged from a source of direct potential through a filter circuit and a charging inductor to a potential that is approximately twice the magnitude of the direct potential applied thereto. In order to vary the pulse length, it is necessary to switch networks simulating different lengths of transmission line. The principal requirement of a switching circuit for effecting variation of the pulse length is that the current in the charging inductance must be negligible at the time the networks are switched. Excessive transient voltages will be developed as a result of the energy stored in the magnetic field of the charging inductance if this condition is not met.

The switching circuit of the present invention reduces the current in the charging inductance to substantially zero before switching the networks by deenergizing the source of direct potential from which the transmission line networks are charged and by providing means to render a gas tube switch such as a thyratron conductive during a predetermined interval of time immediately prior to the switching from one network to another in order to discharge the energy in the filter circuit connected to the direct potential source.

An advantage of the switching circuit of the present invention is that a thyratron is used to discharge the energy in the filter circuit very rapidly, thereby making it unnecessary to use a high-voltage shorting switch, bleeder resistors, or a time-delay relay such as are provided in some prior art switching circuits for pulse modulators. Another advantage of the circuit of the present invention is that the time required to complete a switching cycle is a function only of the operating time of several conventional relays operating in succession and therefore may be relatively short. In addition to the foregoing, the operation of the pulse modulator switching circuit is independent of the pulse duration, the pulse repetition rate and the magnitude of the potential charging the network. Furthermore, the networks may be switched at any time during the modulator charging cycle.

It is therefore an object of this invention to provide an improved switching circuit for a pulse modulator.

Another object of this invention is to provide a pulse modulator switching circuit which operates independently of the pulse length, the pulse repetition rate, the magnitude of the voltage charging the transmission line network, and of the instant of time switching from one transmission line network to another is initiated.

A further object of the invention is to provide a switching circuit for a pulse modulator capable of completing a switching cycle during the relatively short time required for the operation of several conventional relays operating in succession.

A still further object of this invention is to provide a switching circuit for automatically changing the pulse length of a line-type modulator including a thyratron switch wherein the current in the charging inductor is reduced to substantially zero by discharging the energy of the filter circuit through the thyratron switch that is rendered conductive immediately prior to the switching operation.

The novel features which are believed to be characteristic of the invention, both as to its organization and method of operation, together with further objects and advantages thereof, will be better understood from the following description considered in connection with the accompanying drawing, in which an embodiment of the invention is illustrated by way of example. It is to be expressly undersood, however, that the drawing is for the purpose of illustration and description only, and is not intended as a definition of the limits of the invention.

The single figure of the drawing is a schematic diagram of the circuit of the present invention.

Referring now to the drawing, there is shown a conventional line-type modulator generally comprising a high-voltage rectifier circuit 12, a filter circuit 14, a charging inductor 16, a charging diode 18, a first pulse forming network 20 for forming a pulse of length or duration $T_A$, another pulse forming network 22 for forming a pulse of duration $T_B$, and a gas tube switch such as, for example, a hydrogen thyratron 24. Pulse forming networks 20 and 22 simulate transmission lines of different electrical lengths and may comprise a two-terminal network formed by a series inductance having several capacitors shunted between equally spaced taps on the series inductance and a common junction. A shunt diode 23 is connected from the anode of thyratron 24 through a current limiting resistor 25 to ground so as to discharge any negative potential appearing on the anode of thyratron 24. The line-type modulator is connected through a pulse transformer 26 to a magnetron 28, which is shown schematically. Pulse generators 30 and 32 provide sources of periodic pulses having repetition rates A and B, respectively, which are utilized to trigger thyratron 24 thereby to develop output pulses having corresponding pulse lengths $T_A$ and $T_B$, respectively.

The switching circuit of the present invention employs relays 34, 36, 38, 40 and 42. Relay 34 functions to connect and disconnect power on to rectifier circuit 12, relay 40 provides for switching between the pulse forming networks 20 and 22, while relay 42 provides for switching between pulse generators 30 and 32. Relays 36 and 38 are control relays which provide the necessary sequence of operation. The foregoing line-type modulator is conventional and hence only a general description of the overall system has been given.

The line-type modulator is energized by closing an "off-on" switch 44 which connects one end of the coil of relay 34 to a potential source 46, the negative terminal of which is connected to ground. The other end of the coil of relay 34 is connected by a lead 48 through a normally closed contact arm 49 of relay 36 and a normally closed contact arm 52 of relay 38 to ground. In order to clarify the explanation of the functioning of the disclosed circuit, switch 44 is shown in the "on" position for the modulator, thus energizing relay 34, causing its contact arms 54, 55, 56 and 57 to appear in positions corresponding to the energized condition of relay 34. Relays 36, 38, 40 and 42 are shown in a deenergized condition.

Therefore, as previously explained, the closing of off-on switch 44 energizes relay 34. This, in turn, causes contact arm 56 to connect an alternating potential source 58 to a lead 60 which is connected to a primary winding 62 of a transformer 64 of high-voltage rectifier circuit 12, the return connection to alternating potential source 58 being made through ground. The plates of diodes 61 and 63 are connected to the terminals of a secondary winding 65 of transformer 64 to effect full wave rectification of the impressed voltage. The cathodes of diodes 61, 63 are connected to a junction 66 where a unidirectional positive output voltage appears when an alternating potential is impressed across primary winding 62 of transformer 64, the mid-point of secondary winding 65 is grounded.

Junction 66 is connected to filter circuit 14 which comprises a series inductor 68 and a shunt capacitor 70. A smoothed and rectified positive output voltage appears at a junction 72 at the output of filter 14, which is connected through charging inductor 16, charging diode 18, and a junction 73 to a contact arm 74 of relay 40, which may be selectively connected to either one of pulse forming networks 20 or 22. Charging diode 18 is poled so as to permit the charging of a pulse forming network in a positive direction only. As a result of resonance by inductor 16 with the capacitance of network 20 or 22, the potential of junction 73 will increase to approximately double the positive voltage at junction 72. When the potential across pulse forming network 20 reaches its highest point, the charging inductor 16 will be effectively disconnected from the pulse forming network 20 by charging diode 18.

In normal operation, the modulator is triggered by pulses from pulse generator 30 applied through contact arm 76 of relay 42 to the grid of thyratron 24. When ionization occurs in thyratron 24 in response to a triggering pulse, the potential at junction 73 is effectively clamped to ground through the very low resistance of thyratron 24, causing the common junction of the shunt capacitors of the pulse forming network 20 to go sharply negative, thereby to discharge a negative pulse through pulse transformer 26 and to impress it on magnetron 28.

Hence, during normal operation of the modulator, a triggering pulse applied to thyratron 24 renders it conducting, thereby causing the pulse forming network to discharge through pulse transformer 26. Charging inductor 16 prevents appreciable current from flowing through filter circuit 14 during the short interval of time required for this discharge to take place. It will also be found that occasional sparking of magnetron 28 will cause a negative pulse to be reflected from pulse transformer 26 which would have a tendency to charge the pulse forming network 20 in a negative direction, thus causing the network 20 to be subsequently charged to a higher voltage than that which it was designed to produce. In order to prevent this, shunt diode 23 discharges any negative voltage appearing on network 20 to ground through current limiting resistor 25, thereby improving the output stability of the system.

Quite frequently, as previously explained in present day radar systems, it is desirable to change the time duration or length of the transmitted pulses. Changing the duration of the transmitted pulses in a line-type modulator, may involve switching from one pulse forming network to another. In the circuit of the present invention, this switching is accomplished by first removing the excitation from primary winding 62 of rectifier circuit 12. Simultaneously, thyratron 24 is rendered conducting so as to discharge the energy in capacitor 70 of filter circuit 14 through charging inductor 16, charging diode 18, and thyratron 24. During this pulse length switching operation, it is essential that the current through charging inductor 16 be reduced to a negligible value; otherwise extremely high transient voltages can result at junction 73 during the travel time of contact arm 74 of relay 40. The time interval required to discharge the energy in capacitor 70 of filter circuit 14 is of much longer duration than the time required to discharge the energy in pulse forming network 20 during its normal operation and is generally of sufficient duration to allow appreciable current to commence flowing through charging inductor 16. Hence, it is necessary to remove the excitation on primary winding 62 so that capacitor 70 may be completely discharged prior to switching from pulse forming network 20 to pulse forming network 22, in order to have negligible current flowing through charging inductor 16 at the time of switching the networks. Therefore, after the energy stored in capacitor 70 has been dissipated, the second pulse forming network 22 and pulse generator 32 are switched in the circuit. Finally, excitation is reapplied in primary winding 62 of rectifier circuit 12.

One example of the manner in which the thyratron 24 may be rendered conductive for a sufficient length of time and commencing at a desired instant of time, is shown in the drawing. That is, a potential source 84 is caused to charge a capacitor 80 to a positive voltage through a resistor 82. The voltage of potential source 84 must be greater than the grid-cathode ionization potential of thyratron 24. Thyratron 24 is then rendered conductive when contact arm 54 of relay 34 switches resistor 82 from its connection to potential source 84 to the grid of thyratron 24, thereby enabling the positive charge on capacitor 80 to discharge through resistor 82 and thence from the grid to the cathode of thyratron 24 and to ground. Once the gas in thyratron 24 has become ionized, the tube will, of course, remain conductive until the plate-to-cathode potential of the tube falls below a certain critical value. The time constant of capacitor 80 and resistor 82 should be of such a magnitude as to render the thyratron 24 conducting for a sufficiently long duration, in order to allow current to commence flowing through charging inductor 16, diode 18 and thyratron 24 to ground. Representative values for resistor 82 may be of the order of 500 ohms and for capacitor 80 may be of the order of one microfarad when charging inductor 16 is of the order of five henrys. Hence the time constant of network 80, 82 is 500 microseconds.

In the switching circuit shown in the drawing, changing from pulse length $T_A$ to pulse length $T_B$ is automatic once it is initiated manually by the closing of switch 86. The closing of switch 86 energizes relay 36 by completing the connection of its coil across potential source 46 over lead 88. The energization of relay 36 causes contact arm 49 to open the ground return of the coil of relay 34 through lead 48, contact 49 of relay 36 and contact 52 of relay 38, thus causing relay 34 to drop out. Contact arm 56 of relay 34 then opens, removing the excitation from primary winding 62 of transformer 64 of the high voltage rectifier circuit 12. Contact arm 54 of relay 34 simultaneously connects resistor 82 to the grid of thyratron 24, thus enabling the charge on capacitor 80 to discharge through resistor 82, from the grid to the cathode of thyratron 24 and thence to ground, thereby ionizing the thyratron 24 and rendered it conductive. This allows capacitor 70 to discharge through charging inductor 16, charging diode 18, and thyratron 24 to ground. After the voltage on capacitor 70 has been discharged, negligible current will flow through charging inductor 16 and the pulse forming networks may be switched without any detrimental effects.

Energization of relay 36 also closes contact arms 50 and 51. Thus, one end of the coil of relay 38 is connected to potential source 46 through contact arm 51 and lead 88. However, relay 38 is not energized until relay 34 drops out because the other end of the coil of relay 38 is connected through contact arm 50, over lead 90 to contact arm 55 of relay 34 and thence to ground, the contact arm 55 remaining open until relay 34 drops out. Hence, relay 38 will be energized as soon as relay 34 drops out, which occurs after relay 36 is energized. The contact arm 53 of relay 38 acts as a holding contact for relay 38 and connects one end of the coil of relay 38 directly to ground when relay 38 pulls in, thereby shunting the path to ground through contact arm 50 of relay 36, lead 90 and contact arm 55 of relay 34.

In addition to the above, the energization of relay 38 causes contact arm 47 to close, which energizes relays 40 and 42 by completing the connection of their respective coils across potential source 46 through lead 88, contact arm 47 and lead 89 to ground. Contact arms 74 and 76 of relays 40 and 42, respectively, disconnect pulse forming network 20 and pulse generator 30 from the modulator circuit and connect, instead, pulse forming network 22 and pulse generator 32. Simultaneously with the above, contact arm 52 of relay 38 completes the ground connection of the coil of relaly 34 through contact arm 49 of relay 36 and lead 48, thus causing it to pull in. The energization of relay 34 disconnects resistor 82 from the grid of thyratron 24 and reapplies excitation to primary winding 62 by means of contact arms 54 and 56, respectively. At this stage, the modulator is back in operation with pulse forming network 22 and pulse generator 32, thereby producing pulses of time duration $T_B$ and of repetition rate B. It is to be noted from the foregoing description, that the time allowed for discharging the energy stored in capacitor 70 of filter 14 is equal to the operation time for relay 38, while the time actually required for the discharge may be of the order of one millisecond. The operating time for relay 38 will generally be sufficient to allow capacitor 70 to discharge, inasmuch as a conventional relay has an operating time of several milliseconds.

The time sequence of the switching circuit of the present invention is as follows. Assuming the modulator to be in operation as shown in the figure, switching from pulse forming network 20 to network 22 is effected by manually closing switch 86. The closing of switch 86 causes relay 36 to pull-in which, in turn, causes relay 34 to drop out. The deenergization of relay 34 removes the excitation from rectifier 12, connects capacitor 80 to thyratron 24 through resistor 82, thereby rendering thyratron 24 conducting so as to discharge capacitor 70 of filter circuit 14 and, in addition, to cause relay 38 to pull in. When relay 38 is energized, it effects the disconnecting of pulse forming network 20 and pulse generator 30 from the modulator circuit and connects pulse forming network 22 and pulse generator 32 by the energization of relays 40 and 42, respectively. Simultaneously with this switching sequence, the energization of relay 38 also causes relay 34 to pull in again which reapplies excitation to rectifier 12 and disconnects capacitor 80 from thyratron 24, thus putting the modulator back in operation with pulse forming network 22 and pulse generator 32.

At the completion of the switching cycle from pulse forming network 20 to pulse forming network 22, all the relays are in an energized position. Pulse forming network 22 operates in the same manner as does network 20, the only difference being that it produces a pulse of longer time duration.

In switching back from pulse forming network 22 to pulse forming network 20 by opening switch 86, a similar sequence of steps is performed, hence, the description need not be repeated.

What is claimed as new is:

1. In a line-type modulator of the type which includes first and second pulse forming networks having a common junction, a source of periodic pulses, a filter circuit having a shunt capacitor, means for applying a unidirectional potential to said filter circuit, a charging inductor connected between said filter circuit and said first pulse forming network for charging said first pulse forming network to a high potential, a load impedance element, and a thyratron coupled to said source of periodic pulses, said thyratron being connected in series with said load impedance element between said first pulse forming network and said common junction for discharging said first pulse forming network through said load impedance element in response to said periodic pulses; a circuit for switching the pulse forming networks comprising first means for rendering said thyratron conductive for a predetermined time commencing at a desired instant of time, and for substantially simultaneously removing said unidirectional potential from said filter circuit to discharge said shunt capacitor, first switching means operable a predetermined time after said desired instant of time for switching said charging inductor from said first pulse forming network to said second pulse forming network, and second switching means operable after the operation of said first switching means for reapplying said unidirectional potential to said filter circuit.

2. The circuit defined in claim 1 wherein said first means includes a capacitor connected in series with a resistor, and means for charging said capacitor before said desired instant of time to a voltage that exceeds the ionization potential of said tyratron.

3. The circuit defined in claim 2 wherein said resistor and said capacitor have a time constant of sufficient magnitude to enable current flow through said charging inductor and said thyratron to commence, subsequent to said desired instant of time.

4. In a line-type modulator of the type which includes first and second pulse forming networks having a common junction, first and second pulse generators for producing triggering pulses having different repetition rates, a filter circuit having a shunt capacitor, means for applying a unidirectional potential to said filter circuit, a charging inductor connected between said filter circuit and said first pulse forming network for charging said first pulse forming network to a high potential, a load impedance element, and an electronic switch coupled to said first pulse generator and connected in series with said load impedance element between said first pulse forming network and said common junction for discharging said first pulse forming network through said load impedance element in response to said triggering pulses; a circuit for switching the pulse forming networks comprising automatically operable relay means including first switching means and a source of voltage for rendering said electronic switch conductive for a predetermined time and commencing at a desired instant of time, and for removing said unidirectional potential from said filter circuit to discharge said shunt capacitor, second switching means operable a predetermined time after said desired instant of time for switching said charging inductor from said first pulse forming network to said second pulse forming network and for switching said electronic switch from said first pulse generator to said second pulse generator, and third switching means automatically operable after the operation of said second switching means for reapplying said unidirectional potential to said filter circuit.

5. In a line-type modulator of the type which includes first and second pulse forming networks having a common junction, a source of periodic pulses, a filter circuit having a shunt capacitor, means for applying a unidirectional potential to said filter circuit, a charging inductor connected between said filter circuit and said first pulse forming network for charging said first pulse forming network to a high potential, a load impedance element, and a thyratron coupled to said source of periodic pulses and connected in series with said load impedance element between said first pulse forming network and said common junction for discharging said first pulse forming network through said load impedance element in response to said periodic pulses; a circuit for switching the pulse forming networks comprising a storage capacitor connected in series with a resistor, means for charging said storage capacitor to a voltage that exceeds the ionization potential of said thyratron, first switching means manually operable at a desired instant of time for coupling said storage capacitor to said thyratron and for simultaneously removing said unidirectional potential from said filter circuit to discharge said storage capacitor through said resistor and said thyratron, thereby to discharge said shunt capacitor of said filter through said charging inductor and said thyratron, second switching means automatically operable after the operation of said first switching means for switching said charging inductor from said first pulse forming network to said second pulse forming network, and third switching means automatically operable after the operation of said second switching means for disconnecting said storage capacitor from said thyratron and for reapplying said unidirectional potential to said filter circuit.

6. In a line-type modulator of the type which includes first and second pulse forming networks having a common junction, a source of periodic pulses, a filter circuit having a shunt capacitor, means for applying a unidirectional potential to said filter circuit, a charging inductor connected between said filter circuit and said first pulse forming network for charging said first pulse forming network to a high potential, a load impedance element, and a thyratron coupled to said source of periodic pulses and connected in series with said load impedance element between said first pulse forming network and said common junction for discharging said first pulse forming network through said load impedance element in response to said periodic pulses; a storage capacitor connected in series with a resistor, means for charging said storage capacitor to a voltage that exceeds the ionization potential of said thyratron, first relay means for coupling said storage capacitor to said thyratron and for simultaneously removing said unidirectional potential from said filter circuit, second relay means for switching said charging inductor from said first pulse forming network to said second pulse forming network, third relay means for disconnecting said storage capacitor from said thyratron and for reapplying said unidirectional potential to said filter circuit, and means manually operable at a desired instant of time for automatically actuating said first, second and third relay means in the sequence named.

References Cited in the file of this patent

UNITED STATES PATENTS

| | | |
|---|---|---|
| 2,423,024 | Hershberger | June 24, 1947 |
| 2,534,261 | Gorham et al. | Dec. 19, 1950 |
| 2,568,441 | Fyler | Sept. 18, 1951 |